(12) United States Patent
Gallingani

(10) Patent No.: US 11,648,160 B2
(45) Date of Patent: May 16, 2023

(54) WHEELCHAIR LIFT WITH LOW ENERGY CONSUMPTION

(71) Applicant: Autolift S.r.l., Pegognaga—Mantova (IT)

(72) Inventor: Marco Gallingani, Reggio Emilia (IT)

(73) Assignee: Autolift S.r.l., Pegognaga—Mantova (IT)

(*) Notice: Subject to any disclaimer, the term of this patent is extended or adjusted under 35 U.S.C. 154(b) by 291 days.

(21) Appl. No.: 16/515,379

(22) Filed: Jul. 18, 2019

(65) Prior Publication Data

US 2020/0054506 A1    Feb. 20, 2020

(30) Foreign Application Priority Data

Aug. 16, 2018   (EP) .................... 18189342

(51) Int. Cl.
| | | |
|---|---|---|
| *H02K 7/14* | (2006.01) | |
| *A61G 3/06* | (2006.01) | |
| *B60L 53/00* | (2019.01) | |
| *B60L 50/60* | (2019.01) | |
| *B66F 9/22* | (2006.01) | |

(Continued)

(52) U.S. Cl.
CPC ............. *A61G 3/062* (2013.01); *B60L 50/60* (2019.02); *B60L 53/00* (2019.02); *B66F 9/22* (2013.01); *F15B 11/028* (2013.01); *F15B 11/044* (2013.01); *F15B 11/048* (2013.01); *F15B 11/0423* (2013.01); *F15B 15/08* (2013.01);

(Continued)

(58) Field of Classification Search
CPC ............ A61G 2203/30; A61G 2203/34; A61G 3/062; B60L 50/60; B60L 53/00; B60P 1/4471; B66F 9/22; F15B 11/028; F15B 11/0423; F15B 11/044; F15B 11/048; F15B 15/08; F15B 15/18; F15B 15/22; H02J 7/0068
USPC ............................................................ 318/3
See application file for complete search history.

(56) References Cited

U.S. PATENT DOCUMENTS 5,012,165 A * 4/1991 Lautzenhiser ......... A61G 5/045
                                                        318/61
RE41,036 E * 12/2009 Bushey ............... A47L 11/4011
                                                       318/135

(Continued)

FOREIGN PATENT DOCUMENTS

| EP | 2 778 113 A1 | 9/2014 |
| GB | 1 365 511 A | 9/1974 |

OTHER PUBLICATIONS

Extended European Search Report in EP 18189342.1-1113, dated Feb. 12, 2019.

*Primary Examiner* — Kawing Chan
*Assistant Examiner* — Gabriel Agared
(74) *Attorney, Agent, or Firm* — Collard & Roe, P.C.

(57) ABSTRACT

A wheelchair lift with low energy consumption includes a platform assembly to receive a wheelchair. The wheelchair lift includes a hydraulic drive system to move the platform assembly between an entry level position and a ground level position. The wheelchair lift includes a fluid circuit being embodied to transport a hydraulic fluid from a tank using a pump driven by an electric motor to the hydraulic drive system to raise the platform assembly from the ground level position to the entry level position. The fluid circuit is further embodied to transport the hydraulic fluid from the hydraulic drive system via the pump to the tank, when lowering the platform assembly from the entry level position to the ground level position.

10 Claims, 3 Drawing Sheets

(51) Int. Cl.
*F15B 11/028* (2006.01)
*F15B 11/042* (2006.01)
*F15B 11/044* (2006.01)
*F15B 11/048* (2006.01)
*F15B 15/08* (2006.01)
*F15B 15/18* (2006.01)
*F15B 15/22* (2006.01)
*H02J 7/00* (2006.01)

(52) U.S. Cl.
CPC .............. *F15B 15/18* (2013.01); *F15B 15/22* (2013.01); *H02J 7/0068* (2013.01)

(56) References Cited

U.S. PATENT DOCUMENTS

2014/0260222 A1* 9/2014 Yahner ................. F15B 1/02
 60/413
2014/0377047 A1* 12/2014 Gallingani ............ A61G 3/061
 414/546

\* cited by examiner

WHEELCHAIR LIFT WITH LOW ENERGY CONSUMPTION

CROSS REFERENCE TO RELATED APPLICATIONS

Applicant claims priority under 35 U.S.C. § 119 of European Application No. 18189342.1 filed Aug. 16, 2018, the disclosure of which is incorporated by reference.

BACKGROUND OF THE INVENTION

1. Field of the Invention

The invention is directed to a wheelchair lift which enables a wheelchair to be lifted from a ground level position to an entry level position in a vehicle and inversely to be lifted from an entry level position to a ground level position.

2. Description of the Related Art

Vehicular wheelchair lifts are utilized to facilitate lifting of wheelchairs into a vehicle. The wheelchair lift comprises a platform assembly having at least one plate to load a wheelchair. The platform assembly may be moved by a power control assembly between a stowed position in which the platform assembly and other components of the wheelchair lift are collapsed, an entry level position in which the platform assembly is in an unfolded configuration so that the wheelchair placed in a vehicle can be loaded from the floor of the vehicle onto the platform assembly, and a ground level position in which the platform assembly is still unfolded and coplanar to the ground outside the vehicle so that the wheelchair placed on the platform assembly can be unloaded from the platform assembly.

The wheelchair lift is usually mounted in the vehicle by means of a mounting assembly of the wheelchair lift which may be fixed to the floor of the vehicle. The platform assembly of the wheelchair lift may be moved by a hydraulic drive system which enables the platform assembly to be lifted with a wheelchair loaded on the platform assembly from the ground level position to the entry level position for entering the vehicle. The hydraulic drive system may comprise hydraulic cylinders which are coupled to a fluid circuit to transport a hydraulic fluid. The hydraulic fluid is provided in a tank. An electric motor is connected to the pump that sucks the hydraulic fluid, for example oil, from the tank and delivers the hydraulic fluid through the hydraulic fluid circuit up to the cylinders of the hydraulic drive system.

The electric motor is operated by a supply voltage which is provided from the battery of the vehicle. Regarding the increasing spread of electric mobility, the operation of a wheelchair lift mounted in an electric vehicle and driven by an electric motor consumes electric energy provided by the battery of the electric vehicle so that the cruising range of the vehicle will be reduced.

There is a need to provide a wheelchair lift with low energy consumption so that the cruising range of an electric vehicle is just insignificantly influenced by the operation of the wheelchair lift.

SUMMARY OF THE INVENTION

An embodiment of a wheelchair lift having low energy consumption so that the battery of an electric vehicle in which the wheelchair lift is mounted and operated is just insignificantly discharged by the energy consumption of the electric motor of the wheelchair lift is provided in accordance with the invention.

A wheelchair lift with low energy consumption comprises a platform assembly to receive a wheelchair, and a lifting assembly to move the platform assembly between an entry level position and a ground level position which is below the entry level position. The lifting assembly comprises a hydraulic drive system and a tank to provide a hydraulic fluid. The wheelchair lift further comprises a pump to pump the hydraulic fluid from the tank to the hydraulic drive system and an electric motor to drive the pump. The electric motor comprises a terminal to apply an operating voltage to operate the electric motor for driving the pump. The wheelchair lift further comprises a fluid circuit being embodied to transport the hydraulic fluid from the tank to the hydraulic drive system to raise the platform assembly from the ground level position to the entry level position. The fluid circuit is further embodied to transport the hydraulic fluid from the hydraulic drive system via the pump to the tank, when lowering the platform assembly from the entry level position to the ground level position.

A conventional wheelchair lift is usually embodied such that during the lowering of the platform assembly, the hydraulic fluid of the hydraulic drive system flows from the hydraulic cylinders through one or more electric valves (flow control valves) back to the power pack tank without flowing through the pump arranged in the fluid circuit.

In contrast to the conventional wheelchair lift, the proposed wheelchair lift has an energy recovery functionality. During rising of the platform assembly the electric motor drives the pump so that an impeller wheel of the pump rotates in a first rotational direction. Thus, the pump pumps the hydraulic fluid from the tank to the hydraulic drive system. The lowering of the platform assembly is caused by the gravity of the wheelchair which is loaded on the platform assembly. That means that the electric motor and the pump is not used to lower the platform assembly. The pump is deactivated during lowering of the platform assembly.

During the lowering of the platform assembly, hydraulic cylinders of the hydraulic drive system are moved by the lowering motion of the platform assembly so that the hydraulic fluid is pressed backwards in the fluid circuit. As a consequence, the hydraulic fluid flows back from the hydraulic drive system via the pump into the tank. The fluid flow is caused by the gravitational force effecting to the platform assembly and not by driving the pump.

During lowering of the platform assembly, the hydraulic fluid does not flow through the usually provided flow control valves into the tank but will flow back to the pump and from the pump into the tank. During lowering the platform assembly, the fluid flow from the hydraulic drive system to the tank via the pump causes the impeller wheel of the pump to rotate in an opposite direction than during rising of the platform assembly. At the same time also the motor that is mechanically coupled to the pump will rotate in the opposite direction than during rising of the platform assembly.

The higher the load on the platform assembly, the higher will be the revolution speed of the impeller wheel of the pump and the rotational speed of the motor. During the rotation of the electric motor driven by the flow of the hydraulic fluid, the electric motor will work like a dynamo/voltage generator and will produce energy that can be re-accumulated in the vehicle battery of the vehicle in which the wheelchair lift is mounted. This offers the possibility to decrease the power consumption of the wheelchair lift because part of the energy used for raising the load by the rising operation of the platform assembly will be recovered by the wheelchair lift during the lowering operation of the platform assembly.

The electric motor is embodied to provide the supply voltage in dependence on the rotational speed of the electric motor, when the electric motor is operated in the voltage generation mode. According to an embodiment of the wheelchair lift, the wheelchair lift may comprise a control circuit to regulate the rotational speed of the electric motor in dependence on a lowering speed of the platform assembly or a fluid pressure in the fluid circuit, when the electric motor is operated in the voltage generation mode.

It is to be understood that both the forgoing general description and the following detailed description present embodiments and are intended to provide an overview or a framework for understanding the nature and character of the disclosure. The accompanying drawings are included to provide further understanding, and are incorporated into, and constitute a part of, this specification. The drawings illustrate various embodiments and, together with the description, serve to explain the principles and operation of the disclosed concepts.

BRIEF DESCRIPTION OF THE DRAWINGS

Other objects and features of the invention will become apparent from the following detailed description considered in connection with the accompanying drawings. It is to be understood, however, that the drawings are designed as an illustration only and not as a definition of the limits of the invention.

In the drawings.

DETAILED DESCRIPTION OF PREFERRED EMBODIMENTS

Figure 1:
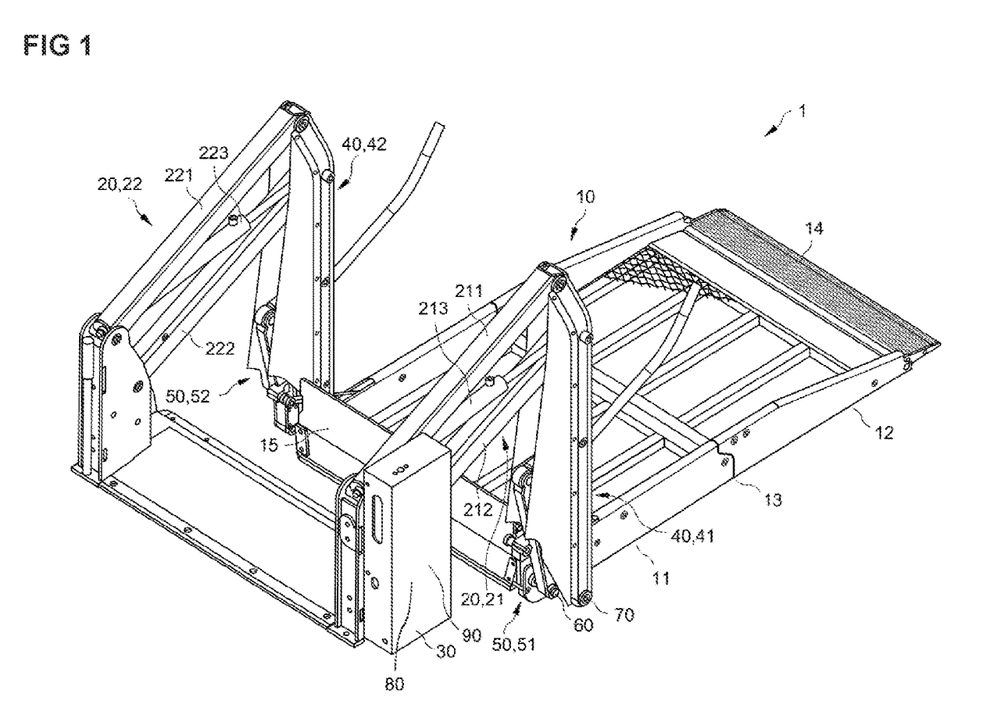
FIG. 1 shows an embodiment of a wheelchair lift with low energy consumption and having an energy recovering functionality.

FIG. 1 shows an embodiment of a wheelchair lift 1 to raise a wheelchair from ground level position into a vehicle at an entry level position. The wheelchair lift 1 comprises a platform assembly 10 to load the wheelchair. The platform assembly 10 comprises at least one plate having a platform to support the wheelchair. The platform assembly 10 may comprise a single plate being constructed as a component in one piece. According to the exemplified embodiment of the wheelchair lift 1 illustrated in FIG. 1, the platform assembly 10 comprises an inner plate 11 and an outer plate 12 to support the wheelchair. The outer and inner plates 11, 12 are pivotably coupled by a hinged unit 13 which is arranged at the bottom side of the platform assembly 10 between the inner plate 11 and the outer plate 12.

An outer roll stop means 14 is mounted to the end of the outer plate 12, and an inner roll stop means 15 is mounted to an end of the inner plate 11. In a retracted position of the roll stop means 14, 15 the roll stop means prevent a wheelchair from rolling off the front end and back end of the platform assembly 10, when the platform assembly is lowered from the entry level position to the ground level position and vice versa.

The wheelchair lift 1 further comprises a lifting assembly 20 to move the platform assembly 10 between the entry level position and the ground level position. The wheelchair lift 1 comprises a power control assembly 30 to control the movement of the platform assembly 10 between a ground level position in which the inner and outer plates 11, 12 of the platform assembly 10 are unfolded and are moved to the ground level, an entry level position in which the inner and outer plates 11, 12 of the platform assembly 10 are in an unfolded configuration and in which the wheelchair lift may enter the platform assembly from the floor of a car or may enter the car from the platform assembly. The power control assembly 30 is further configured to move the platform assembly from the entry level position to a stowed position in which the inner and outer plates 11, 12 of the platform assembly are collapsed.

The wheelchair lift 1 further comprises a holding device 40 to movably hold the platform assembly 10. The holding device 40 comprises a holding arm 41 and a holding arm 42 being arranged at a distance to each other. Each of the holding arms 41, 42 comprises an upper and a lower portion which may be formed as a unique part. The respective upper portion of the holding arms 41, 42 is pivotably coupled to the lifting assembly 20. The respective lower portion of the holding arms 41, 42 which is formed as a substantially vertical arm is pivotably coupled to the platform assembly 10, particularly to the inner plate 11 of the platform assembly 10.

The holding arms 41, 42 may be pivotably coupled to the platform assembly 10 by a coupling device 70. The coupling device 70 is configured to pivotably couple the platform assembly 10, particularly the inner plate 11 of the platform assembly 10, to the holding device 40. The coupling device 70 forms a rotational axis for the inner plate 11.

The wheelchair lift 1 further comprises an elbow assembly 50 comprising an elbow device 51 and an elbow device 52. The elbow devices 51 and 52 are pivotably coupled to a respective side panel of the inner plate 11 by a coupling device 60.

The lifting assembly 20 to lift and lower the holding device 40 and the platform assembly 10 may respectively comprise a parallelogram actuating linkage structure. Each of the parallelogram actuating linkage structures has a top actuating arm 211, 221 and a bottom actuating arm 212, 222 which are located substantially parallel to each other. The respective top actuating arms 211, 221 and the respective bottom actuating arms 212, 222 may be coupled by a respective hydraulic cylinder 213, 223. The hydraulic cylinder 213 is part of a hydraulic drive system 21, and the hydraulic cylinder 223 is part of a hydraulic drive system 22.

Figure 2:
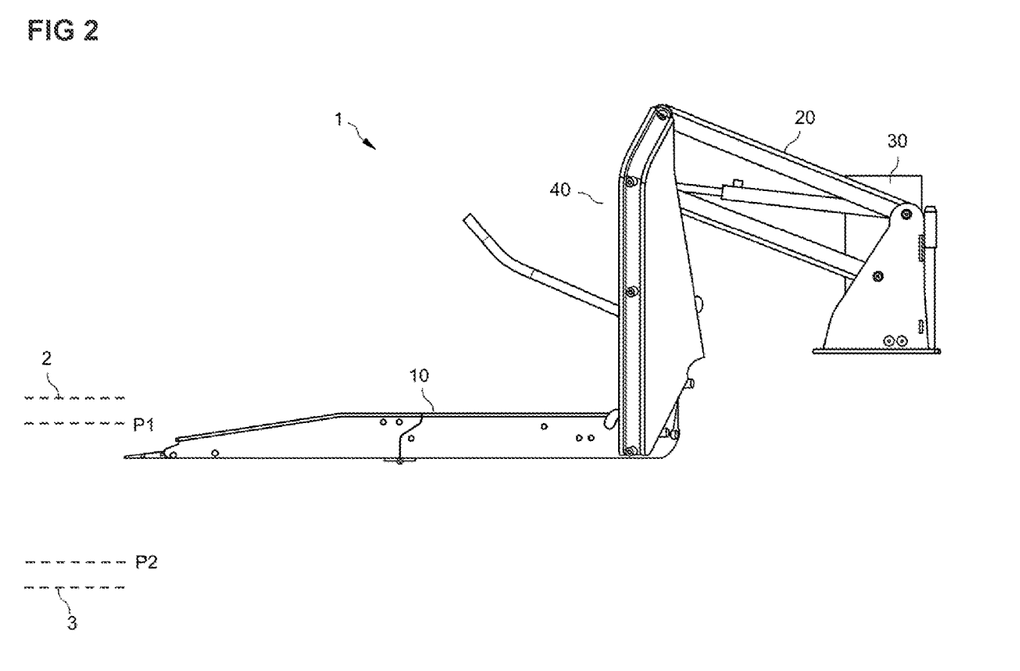
FIG. 2 shows an embodiment of a wheelchair lift with low energy consumption and having an energy recovering functionality with an unfolded platform assembly placed between an entry level position and a ground level position.

FIG. 2 shows the wheelchair lift 1 in an unfolded configuration between the entry level position 2, for example a position having the same height as the floor of a vehicle/car in which the wheelchair lift is mounted and the ground level position 3 which is below the entry level position, for example a level outside the vehicle being planar to the ground to load the wheelchair onto the platform assembly 10 or to unload the wheelchair lift from the platform assembly. In the entry level position the inner and outer plates 11, 12 are unfolded and the upper surfaces of the inner and outer plates form a continuous area to contact a floor in a vehicle to load/unload the wheelchair. In the ground level position, the inner and outer plates 11, 12 of the platform assembly are planar with the ground.

In order to put a wheelchair down to the ground level position 3, the top actuating arms 211, 221 and bottom actuating arms 212, 222 of the lifting assembly 20 are slanted so that the unfolded platform assembly 10 is moved by the holding device 40 from the entry level position 2 to the ground level position 3 which is below the entry level position 2, as shown in FIG. 2.

Figure 3:
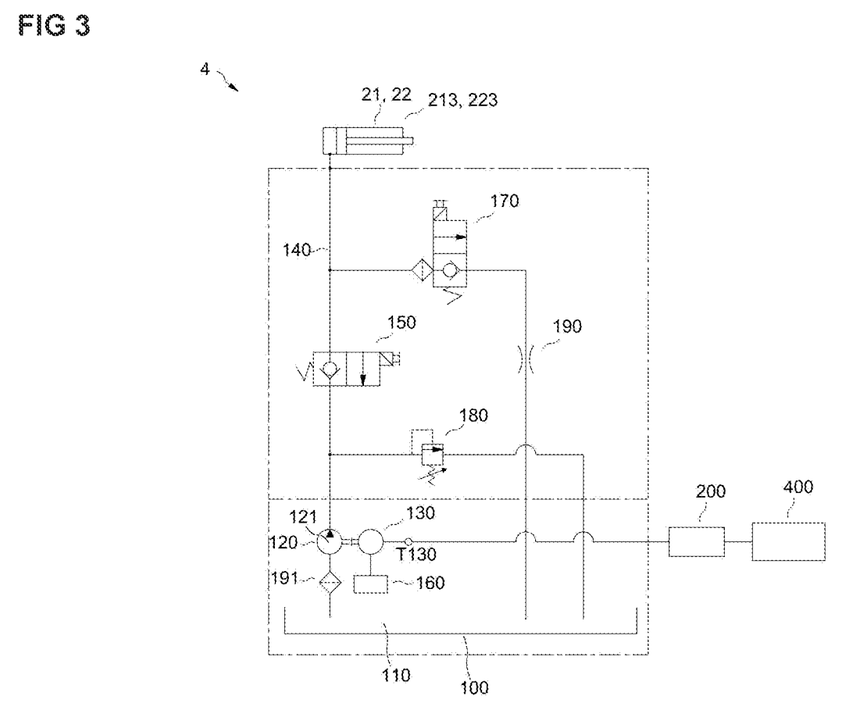
FIG. 3 shows an embodiment of a hydraulic system of a wheelchair lift with low energy consumption and having an energy recovering functionality.

FIG. 3 shows a (hybrid) hydraulic system 4 of a wheelchair lift 1 to lift the platform assembly 10 from the ground level position to the entry level position. The hydraulic system 4 of the wheelchair lift 1 comprises a tank 100 to provide a hydraulic fluid 110. The hydraulic system 4 further comprises a pump 120 to pump the hydraulic fluid 110 from the tank 100 to the hydraulic drive systems 21, 22 to operate the hydraulic cylinder 213 and the hydraulic cylinder 223. A filter 191 may be provided between the tank 100 and the pump 120. The hydraulic system 4 of the wheelchair lift 1 further comprises an electric motor 130 to drive the pump 120. The motor 130 comprises a terminal T130 to apply an operating voltage to operate the electric motor 130 for driving the pump 120. The electric motor 130 is mechanically coupled to an impeller wheel 121 of the pump 120.

The hydraulic system 4 of the wheelchair lift 1 comprises a fluid circuit 140 being embodied to transport the hydraulic fluid 110 from the tank 100 to the hydraulic drive system 21, 22 to raise the platform assembly 10 from the ground level position 3 to the entry level position 2. A valve 170 coupled to a fluid flow limiting device 190 may be provided to transport the hydraulic fluid from the hydraulic drive systems 21, 22 to the tank 100.

According to the embodiment of the hydraulic system 2, the fluid circuit 140 is embodied to transport the hydraulic fluid 110 from the hydraulic drive system 21, 22 via the pump 120 back to the tank 100, when lowering the platform assembly 10 from the entry level position 2 to the ground level position 3.

The electric motor 130 is embodied to drive the impeller wheel 121 of the pump 120 in a first rotating direction to transport the hydraulic fluid 110 from the tank 100 to the hydraulic drive system 21, 22. During this operating state, the platform assembly 10 is raised from the ground level position 3 to the entry level position 2. The pump 120 is further embodied so that the impeller wheel 121 rotates in a second rotating direction being opposite to the first rotating direction, when the hydraulic fluid 110 flows from the hydraulic drive system 21, 22 to the tank 100. According to the proposed configuration of the hydraulic system 2, the fluid circuit 140 is embodied such that the hydraulic fluid 110 flows from the hydraulic drive system 21, 22 backwards through the pump 120 to the tank 100, when the platform assembly 10 is lowered from the entry level position 2 to the ground level position 3.

The motor 130 is embodied to provide a supply voltage at the terminal T130, when the impeller wheel 121 rotates in the second rotating direction. During the rotation of the impeller wheel 121 in the second direction, the electric motor 130 works like a dynamo and will produce energy that can be re-accumulated in the vehicle battery. As a consequence, part of the energy used from the battery for raising a load by the wheelchair lift will be recovered during the lowering operation of the platform assembly so that the power consumption of the wheelchair lift is significantly decreased.

In order to enable the hydraulic fluid flow from the hydraulic drive system 21, 22 via the pump 120 to the tank 100, a bidirectional flow control valve 150 is arranged in the hydraulic fluid circuit 140 between the pump 120 and the hydraulic drive system 21, 22. The bidirectional flow control valve 150 enables a fluid flow of the hydraulic fluid, for example an oil, from the hydraulic drive system 21, 22, in particular from the hydraulic cylinders 213, 223 back through the pump 120 into the tank 100.

The rotational speed of the impeller wheel 121 of the pump 120 and thus the rotational speed of the electric motor 130 during lowering of the platform assembly 10 from the entry level position 2 to the ground level position 3 depends on the load being placed on the platform assembly 10. A low load placed on the platform assembly 10 will cause the platform assembly to be moved down by the gravitational force of the load with a lower speed than a higher load.

The pump 120 has a certain inertia before the rotation of the impeller wheel 121 starts, when a load is placed on the platform assembly and the lifting assembly is released to move down by the gravitational force caused by the load on the platform assembly. Furthermore, the motor 130 tends to brake, when it starts producing electricity.

For these reasons, it is difficult to recover the energy with no load or very little load on the platform assembly 10. In the condition of a high load applied to the platform assembly 10, the pump-motor unit will start producing the maximum quantity of energy but the lowering speed of the platform assembly 10 between the entry level position 2 and the ground level position 3 will increase rapidly.

The high load on the platform can create quite a hard start of the descent procedure and a hard stop when the platform assembly strikes the ground. Such sudden movements are very bad for disabled people and their joints. In some cases, the sudden movements of the platform assembly can be very dangerous for the health of a person sitting in a wheelchair. Furthermore, such sudden movements can be very frightening for the person in the wheelchair who would feel themselves falling.

According to a possible embodiment, the wheelchair lift 1 comprises a control circuit 160 to regulate the rotational speed of the electric motor 130 in dependence on at least one of an actual detected lowering speed of the platform assembly 10 between the entry level position 2 and the ground level position 3 or an actual detected fluid pressure in the hydraulic fluid circuit 140. The electric motor 130 that works as a dynamo/voltage generator generates the supply voltage at the terminal T130 in dependence on the rotational speed of the electric motor/generator.

In the voltage generation mode (dynamo mode) of the electric motor, the rotational speed of the electric motor 130 is regulated by the control circuit 160 to recover the maximum amount of energy possible. Assuming a low load is applied on the platform assembly 10, the control circuit 160 is embodied to control the rotational speed of the electric motor 130 to reach the right rotational speed to produce a low quantity of energy in order to prevent braking of the lowering movement of the platform assembly by the energy generation and to let the platform assembly 10 move fast enough.

In the case of a high load placed on the platform assembly 10, the control circuit 160 is embodied to control the rotational speed of the electric motor 130 to reach the right rotational speed to produce the maximum quantity of energy. In order to set the right rotational speed of the electric motor/generator 130 in the case of a high load on the platform assembly, a braking resistor is used. The control circuit 160 is configured to activate the braking resistor to reduce the rotational speed of the motor/generator 130.

If the platform assembly is loaded by a high load which would lead to a high lowering speed of the platform assembly, the control circuit 160 activates the braking resistor to absorb any current provided by the electric motor/generator 130. The rotational speed of the electric motor 130 being effective as a voltage generator is thus reduced and also the rotational speed of the impeller wheel 121 of the pump is reduced. As a consequence, the reduced rotational speed of the generator 130/the pump 120 tends to brake the lowering movement of the platform assembly 10 so that the platform assembly 10 can be prevented from moving too fast from the entry level position 2 to the ground level position 3.

According to a possible embodiment, the wheelchair lift 1 comprises a speed sensor 80 to sense the lowering speed of the platform assembly 10. The speed sensor 80 can detect the lift lowering speed of the platform assembly 10 between the entry level position 2 and the ground level position 3 any time. The control circuit 160 can accordingly regulate the rotational speed of the electric motor/generator 130 to produce a low or high quantity of electrical energy in dependence on the load on the platform assembly.

The control circuit 160 may be configured to regulate the rotational speed of the electric motor/generator 130 to produce a low quantity of energy, when the speed sensor 80 detects a low lowering speed of the platform assembly, wherein the low lowering speed of the platform assembly is caused by a low load applied on the platform assembly 10.

The control circuit 160 may be further configured to control the electric motor 130 to reduce the rotational speed of the electric motor 130, when the electric motor 130 is operated in the voltage generation mode and the lowering speed of the platform assembly 10 sensed by the speed sensor 80 is above a threshold value.

The control circuit 160 regulates the rotational speed of the electric motor/generator 130 by the braking resistor to produce the maximum quantity of electrical energy, when the speed sensor 80 detects a high lowering speed of the platform assembly, because a high load is applied on the platform assembly 10. In order to avoid that the platform assembly 10 will move too fast from the entry level position 2 to the ground level position 3 due to the high load on the platform, the control circuit 160 activates/controls the braking resistor to absorb any generated current, when the speed sensor 80 detects the high lowering speed. Thus, the rotational speed of the generator 130 is reduced and, as a consequence, the lowering speed of the platform assembly gets smaller.

According to a possible embodiment, the wheelchair lift 1 may comprise a pressure sensor 90 to sense a pressure of the hydraulic fluid 110 in the fluid circuit 140. The pressure sensor 90 can detect the pressure in the hydraulic fluid circuit any time, and the control circuit 160 can accordingly regulate the rotational speed of the electric motor 130 to generate the electrical energy in dependence on the pressure of the hydraulic fluid detected by the pressure sensor 90.

If the pressure sensor 90 detects a high fluid pressure in the fluid system caused by a fast movement of the platform assembly, the control circuit 160 controls the rotational speed of the electric motor/generator 130 to produce a high amount of electrical energy. According to an embodiment of the wheelchair lift, the control circuit 160 is configured to control the electric motor 130 to reduce the rotational speed of the electric motor 130, when the electric motor 130 is operated in the voltage generation mode and the pressure of the hydraulic fluid 110 sensed by the pressure sensor 90 is below a threshold value. In particular, the control circuit 160 controls the electric motor/generator 130 to reduce the rotational speed of the electric motor/generator 130 by activating the braking resistor. As a consequence, the lowering speed of the platform assembly is reduced.

According to another possible embodiment, the control circuit 160 is embodied to activate the electric motor 130 for a short time in order to overcome the system inertia of the pump 120, when the load applied to the platform assembly 10 is too low and the lowering movement of the platform assembly 10 does not start. In particular, the control circuit 160 is configured to activate the electric motor 130 to move the impeller wheel 121 of the pump 120 in the second rotating direction to overcome the inertia of the pump 120, when a load placed on the platform assembly 10 is below a weight value.

According to a possible embodiment of the wheelchair lift 1, the control circuit 160 is configured to regulate a rotational speed of the electric motor 130 driven by the backward flow of the hydraulic fluid as a dynamo so that the platform assembly 10 starts the lowering of the platform assembly 10 between the entry level position 2 and a first position P1 below the entry level position, as shown in FIG. 2, with an initial velocity. Furthermore, the control circuit 160 is configured to regulate the rotational speed of the electric motor 130 driven by the backward flow of the hydraulic fluid as a dynamo so that the platform assembly 10 finishes the lowering movement of the platform assembly 10 between a second position P2 below the first position P1 and above the ground level position 3 and the ground level position 3, as shown in FIG. 2, with a final velocity. The initial and final velocities are below the velocity of the platform assembly 10 by which the platform assembly 10 is moved between the first position P1 and the second position P2.

The control circuit 160 allows an accurate speed control of the movement of the platform assembly 10. In particular, the control circuit 160 enables the platform assembly 10 to be moved with a soft start ramp and a soft stop ramp that will give the user a very high comfort level, as well as being a safe solution. The energy recovering system of the proposed wheelchair lift offers an accurate control of the lowering speed of the platform assembly 10, independently from the oil viscosity, temperature, friction of the components etc.

An energy recovering system for a vehicle may comprise the wheelchair lift 1 with an energy recovering functionality, as described above, and a battery 200 to operate electrical components of the vehicle. As shown in FIG. 3, the terminal T130 of the electric motor 130 is connected to the battery 200. The battery 200 is configured to provide the operating voltage for operating the wheelchair lift 1 to the terminal T130 of the electric motor 130. The battery 200 provides the operating voltage to drive the motor 130 to rise the platform assembly from the ground level position to the entry level position.

The electric motor 130 is configured to be operated in a voltage/current generating operation mode (dynamo mode), when the platform assembly is lowered from the entry level position to the ground level position. When operated in the dynamo mode, the electric motor 130 generates the supply voltage at the terminal T130 so that a supply current Is is provided in dependence on the supply voltage at the terminal T130 of the electric motor 130 to load the battery 200.

The wheelchair lift 1 being provided with the energy recovering system may be used in an electric vehicle in which the battery 200 is embodied as a battery for operating an electric motor 300 of the electric vehicle.

Although only a few embodiments of the present invention have been shown and described, it is to be understood that many changes and modifications may be made thereunto without departing from the spirit and scope of the invention.

LIST OF REFERENCE SIGNS 1 wheelchair lift
2 entry level position
3 ground level position
4 hydraulic system
10 platform assembly
11 inner plate
12 outer plate
13 hinge unit
14 outer roll stop means
15 inner roll stop means
20 lifting assembly
21 hydraulic drive system
22 hydraulic drive system
211, 221 top actuating arm
212, 222 bottom actuating arm
213, 223 hydraulic cylinder
30 power control assembly
40 holding device
41, 42 holding arm
50 elbow assembly
51, 52 elbow device
60 coupling device
70 coupling device
80 speed sensor
90 pressure sensor
100 tank
110 hydraulic fluid
120 pump
121 impeller wheel
130 electric motor
140 fluid system
150 bidirectional flow control valve
160 control circuit
170 valve
180 pressure limiting valve
190 fluid flow limiting device
191 filter
200 battery
300 electric motor

What is claimed is:

1. A wheelchair lift with low energy consumption, comprising:
a platform assembly to receive a wheelchair;
a lifting assembly to move the platform assembly between an entry level position and a ground level position which is below the entry level position, wherein the lifting assembly comprises a hydraulic drive system, the hydraulic drive system comprising a hydraulic cylinder;
a tank to provide a hydraulic fluid;
a pump to pump the hydraulic fluid from the tank to the hydraulic drive system;
an electric motor to drive the pump, wherein the electric motor comprises a terminal to apply an operating voltage to operate the electric motor for driving the pump;
a fluid circuit being embodied to transport the hydraulic fluid from the tank to the hydraulic drive system to raise the platform assembly from the ground level position to the entry level position; and
a control circuit to regulate a rotational speed of the electric motor in dependence on at least one of a lowering speed of the platform assembly detected by a speed sensor or a fluid pressure in the fluid circuit detected by a pressure sensor, when the electric motor is operated in a voltage generation mode;
wherein the fluid circuit is further embodied to transport the hydraulic fluid from the hydraulic drive system via the pump to the tank, when lowering the platform assembly from the entry level position to the ground level position;
wherein the lifting assembly comprises a top actuating arm and a bottom actuating arm configured as a parallelogram actuating linkage structure;
wherein the top actuating arm and the bottom actuating arm are coupled by the hydraulic cylinder;
wherein the control circuit is embodied to control the rotational speed of the electric motor in the voltage generation mode of the electric motor to produce a lower quantity of energy to prevent braking of the lowering movement of the platform assembly so that the platform assembly is moved fast enough for operating the electric motor in the voltage generation mode, when a first load is applied on the platform assembly than when a second load being higher than the first load is applied on the platform assembly;
wherein the pump comprises an impeller wheel;
wherein the electric motor is embodied to drive the impeller wheel in a first rotating direction to transport the hydraulic fluid from the tank to the hydraulic drive system;
wherein the pump is embodied so that the impeller wheel rotates in a second rotating direction, when the hydraulic fluid flows from the hydraulic drive system to the tank;
wherein the electric motor is embodied to be operated in the voltage generation mode to provide a supply voltage at the terminal, when the impeller wheel rotates in the second rotating direction; and
wherein the electric motor is embodied to provide the supply voltage in dependence on the rotational speed of the electric motor, when the electric motor is operated in the voltage generation mode.

2. The wheelchair lift of claim 1, further comprising:
a bidirectional flow control valve being arranged in the fluid circuit between the pump and the hydraulic drive system.

3. The wheelchair lift of claim 1,
wherein the control circuit is configured to activate the electric motor to move the impeller wheel of the pump in the second rotating direction to overcome the inertia of the pump, when a load placed on the platform assembly is below a weight value.

4. An energy recovering system for a vehicle, comprising:
the wheelchair lift as claimed in claim 1 for mounting to a vehicle; and
a battery to operate electrical components of the vehicle;
wherein the terminal of the electric motor is connected to the battery;
wherein the battery is configured to provide the operating voltage for operating the wheelchair lift to the terminal of the electric motor; and
wherein the electric motor is configured to provide the supply voltage to the terminal of the electric motor and to provide a supply current at the terminal of the electric motor to load the battery.

5. The energy recovering system of claim 4,
wherein the battery is embodied as a battery for operating an electric motor of an electric vehicle.

6. The wheelchair lift of claim 1, further comprising:
the speed sensor to sense the lowering speed of the platform assembly.

7. The wheelchair lift of claim 6,
wherein the control circuit is configured to control the electric motor to reduce the rotational speed of the electric motor, when the electric motor is operated in the voltage generation mode and the lowering speed of the platform assembly sensed by the speed sensor is above a threshold value.

8. The wheelchair lift of claim 1, further comprising:
the pressure sensor to sense a pressure of the hydraulic fluid in the fluid circuit.

9. The wheelchair lift of claim 8,
wherein the control circuit is configured to control the electric motor to reduce the rotational speed of the electric motor, when the electric motor is operated in the voltage generation mode and the pressure of the hydraulic fluid sensed by the pressure sensor is below a threshold value.

10. The wheelchair lift of claim 1,
wherein the control circuit is configured to regulate a speed of the electric motor so that the platform assembly is moved between the entry level position and a first position below the entry level position with an initial velocity;
wherein the control circuit is configured to regulate the speed of the electric motor so that the platform assembly is moved between a second position and the ground level position with a final velocity, the second position being below the first position and above the ground level position; and
wherein the initial velocity and the final velocity are below a velocity of the platform assembly by which the platform assembly is moved between the first and the second position.

* * * * *